United States Patent

[11] 3,598,968

[72] Inventor Richard A. Victor
Danville, Calif.
[21] Appl. No. 795,808
[22] Filed Feb. 3, 1969
[45] Patented Aug. 10, 1971
[73] Assignee The United States of America as represented by the United States Atomic Energy Commission

[54] CODED ARRANGEMENT OF INDUCTIVELY DETECTABLE ELECTRICAL CONDUCTING SEGMENTS
13 Claims, 2 Drawing Figs.

[52] U.S. Cl. .... 235/61.11 R, 235/61.12 N, 331/65
[51] Int. Cl. .... G06k 7/00, G06k 19/00, G01n 27/86
[50] Field of Search .... 235/61.11, 61.114, 61.116, 61.7 A; 340/149 A; 331/65

[56] References Cited

UNITED STATES PATENTS

| | | | |
|---|---|---|---|
| 2,158,749 | 5/1939 | Elliott | 235/61.12 X |
| 3,453,598 | 7/1969 | Schweizer | 340/149 A |
| 3,508,031 | 4/1970 | Cooper, Jr. | 340/149 A |

*Primary Examiner*—Daryl W. Cook
*Attorney*—Roland A. Anderson

ABSTRACT: An identification badge in which a coded arrangement of nonmagnetic electrically conductive segments are embedded for successive presentation to a coil of an oscillator with which eddy currents are induced in each segment as the badge is manually moved past the coil. The oscillator normally is oscillated to produce reference signals that are rectified to obtain a reference output level. Upon a segment being moved adjacent the coil, the oscillator becomes loaded and the amplitude of its signals reduced to provide a corresponding rectified output signal level that is lower than the reference level.

INVENTOR.
RICHARD A VICTOR
BY
[signature]
ATTORNEY

CODED ARRANGEMENT OF INDUCTIVELY DETECTABLE ELECTRICAL CONDUCTING SEGMENTS

BACKGROUND OF THE INVENTION

This invention relates to permanently encoded data systems, and more particularly, it pertains to a coded arrangement of electrically conductive segments that may be read with an oscillator coil.

Data in information systems is commonly represented in various forms including coded magnetic variations, coded perforations, and optically detectable coded arrangements of spots and raised indicia. However, for certain uses, such as identification cards or badges, where it is necessary that there be a high degree of permanency of the coded information, where the information must be protected from duplication or alteration, and where secrecy of the information must be preserved, the known systems are found to be inadequate. For example, coded magnetic variations, either permanent magnetic slugs or induced magnetic recordings, are easily detectable with powdered iron. Furthermore, magnetic recordings can be easily altered by a re-recording, while any type of coded magnetic variations can be shielded, with foil for example, and the coded information modified, such as with rubber magnetic material. In the other types of information systems, the coded perforations, optically detectable spots and raised indicia are detectable by casual visual inspection and can be easily altered or duplicated. Furthermore, it is desirable that any attempt to alter data representations on an identification card or badge will result in obvious damage to the card, thereby rendering it useless with respect to any visual identifying information thereon such as pictures, serial number or name that is usually carried on such a card.

SUMMARY OF THE INVENTION

In brief, the present invention pertains to representing data with coded arrangements of electrically conductive segments and to detection of the coded arrangements by influencing the output of an oscillator with each segment by passing the segments beneath a read coil of the oscillator. The conducting segments are susceptible of being visually concealed between thin sheets of nonconducting material and they cannot be detected without damage to the overlying sheets in the absence of sophisticated detection equipment. Furthermore, there is no known means for shielding such a coded arrangement without detection of the shield by the reading equipment.

It is an object of the invention to place electrically conductive segments in a coded arrangement and to inductively detect the arrangement.

Another object is to permanently encode data such that it cannot be easily detected or altered.

Another object is to construct a record of encoded data that is concealed from visual and magnetic detection.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
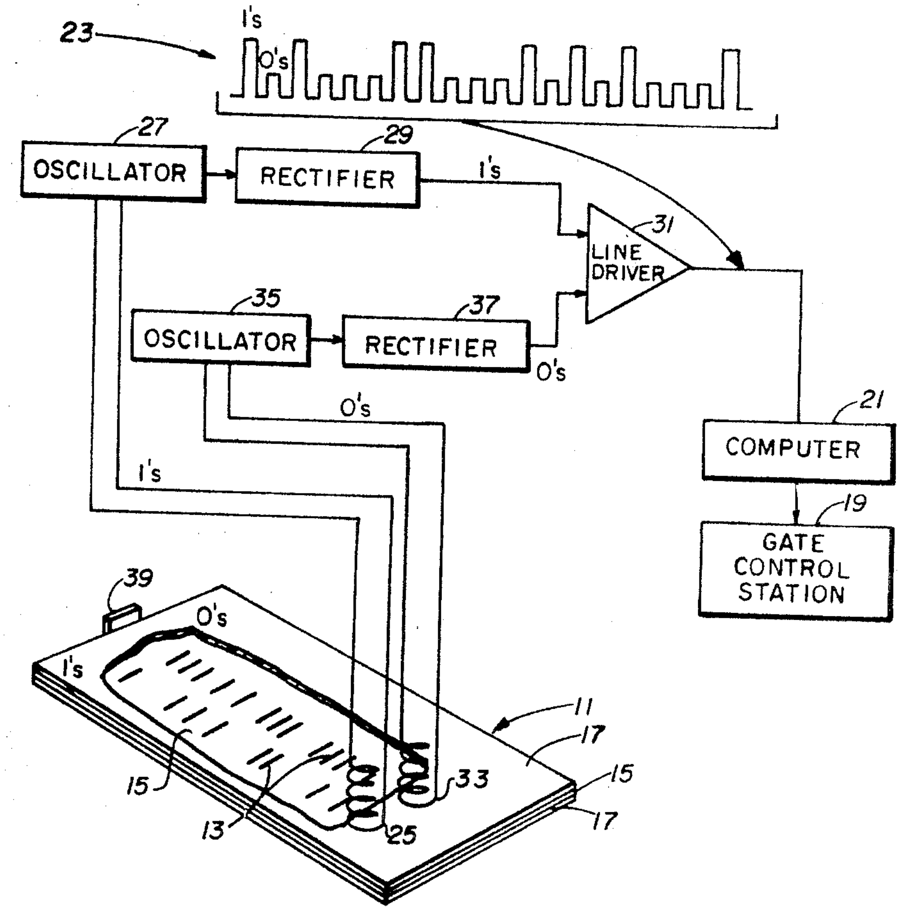
FIG. 1 is a diagram of a coded arrangement of electrically conductive segments and a block diagram of a system for detecting and utilizing the data represented by the coded segments.

Referring to the drawing there is shown in FIG. 1 a record 11 comprised of thin nonmagnetic electrically conductive segments 13 secured to a backing 15. The segments are arranged in a 1's column and a 0's column and may be conveniently secured to the backing 15 by means of known printed-circuit techniques. The segments 13 may be hidden from visual observation by laminating the backing 15 between thin opaque sheets 17. If desired, the sheets 17 may bear conventional visual identifying data such as name, picture, serial number or signatures that normally appears on an identification badge.

The coded data on the record 11 may be used, for example, to control automatic entry of authorized personnel to a limited access area. Such entry may be through a gate control station 19 which is activated by presentation of the record to a reader at the station to permit entry under control of a computer 21. The computer may be used to verify an identifying number coded on the record and limit entry and egress to one alternate occurrence per identifying number. For a large installation a number of gate control stations may be used with all of the gate control stations under the control of a single central computer.

The data represented by the coded segments 13 may be asynchronously transduced, in a manner presently described, to a series of 1's and 0's pulses 23 for transmission over a single line to the computer 21. The 1's segments are detected with a pickup coil 25 as part of an oscillator 27 whose output is rectified with a rectifier 29 for application through a line driver 31 to the computer 21. The 0's segments are detected with a pickup coil 33 as part of an oscillator 35 whose output is rectified with a rectifier 37 for application through the line driver 31 to the computer.

The pickup coils 25 and 33 are connected in the input circuits of respective oscillators 27 and 35. These oscillators may be chosen from the various conventional types such as the standard Colpitts oscillator. Under normal conditions the output of each of the oscillators is rectified to a standard DC reference level. Upon a conducting segment 13 being positioned or moved past either of the read coils 25 or 33, energy in the form of eddy currents is induced into the segment. These currents constitute a load on the oscillator input circuit, causing the amplitude of oscillations in the oscillator output to be substantially reduced. The reduced oscillations are rectified to a DC level substantially lower than the reference level. Thus as a series of segments 13 are moved beneath the read coils 25 and 33, a series of pulses appear at the respective outputs of the rectifiers 29 and 37. With the frequency of each oscillator set so that a substantial number of oscillations occur during the period that a conduction segment is beneath the read coil, the pulses at the output of each rectifier constitute envelopes corresponding to the amplitude modulation of the oscillators by the segments 13.

Figure 2:
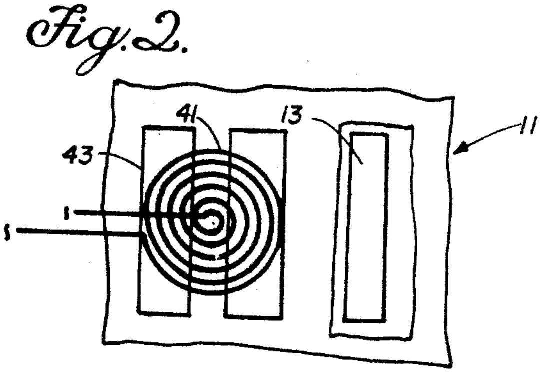
FIG. 2 is a diagram of a read head that may be used in the system of FIG. 1 for sharpening pulses.

In order to produce sharply defined boundaries between the reference output level and an output pulse, the pickup coils 25 and 33 may be provided with shields. A suitably shielded pickup coil 41 is shown in FIG. 2. The coil 41 is pancake wound and is provided with a pair of thin electrically conductive shields 43 that may be conveniently attached to the coil as by gluing. The shields 43 are parallel, spaced apart and oriented to provide a window that is parallel to the segments 13 when the record i11 is inserted in its receiving device. Such a shielding arrangement permits magnetic flux to extend from the coil 41 to the segments 13 only through the window, thereby producing sharply defined output pulses. The shielding also prevents detection interference between adjacent segments, thereby allowing a greater packing density of the segments 13 on the record 11.

In operation of the system shown in FIG. 1, a record or badge-receiving device (not shown) is located at the gate control station 19. To gain admittance through the station, a record or badge 11 is inserted in the receiving device which is provided with an optical or coil microswitch 39 that is activated by the end of the badge upon full insertion of the badge into the receiving device. Activation of the switch 39 produces a distinctive signal that is transmitted to the computer for signaling the computer that the immediately following signals should be processed for determination of operation of the gate control station 19. Upon withdrawal of the badge 11, the conducting segments 13 in the 1's and 0's columns are successively presented to the read coils 25 and 33 respectively. A corresponding series of output pulses are thereby generated at the output of the rectifiers 29 and 37. The outputs from the rectifiers may be conveniently adjusted to produce differential output levels to distinguish the 1's and 0's pulses. These pulses are applied to the line driver 31 for transmission over a common line to the computer 21. Since there is only one segment in each ordinal position, the output pulses may be serially transmitted over a single line to the computer 21.

Since the production of the pulse signals 23 is not dependent on the rate at which the segments are moved past the read coils 25 and 33, manual means may be used for withdrawing the badge. Furthermore, the system may conveniently be made asynchronous with the attendant advantages of an asynchronous system wherein no clock pulses are required and a minimum of mechanical equipment and electronic circuitry is required. In such a system a single buffer storage may be provided at the computer 21 for temporary storage of the signals 23. Upon determination at the computer that the temporarily stored signals match information permanently stored in the computer, a signal is transmitted from the computer to the gate control station 19 for automatically admitting the person in possession of the badge. In the event that the badge 11 does not bear information that activates the computer to allow entry at the control station, the computer can signal the station that the card be reinserted in the holder or it can activate auxiliary equipment for recording details of the situation or alert security personnel.

In a system exemplifying the invention, a record 11 was constructed wherein the conducting segments 13 had dimensions of ¼ inches ×1/16 inches and were etched from 0.005 inches thick copper foil. The read coils 25 and 33 were each 50-turn pancake air core coils, each connected in the input circuit of a Colpitts oscillator which was designed to oscillate in the range of 2 MHz.

While an embodiment of the invention has been shown and described, further embodiments or combinations of those described herein will be apparent to those skilled in the art without departing from the spirit of the invention or the scope of the appended claims.

I claim:

1. In a system for reading an encoded record, comprising:
- a plurality of nonmagnetic electrically conductive segments for conducting eddy currents, each of said segments being electrically separate, said segments being positioned in a coded arrangement;
- electrical insulating means for holding said segments in said said coded arrangement;
- means for detecting the coded arrangement of said segments, said detecting means including a coil for inducing eddy currents in said segments, said detecting means being responsive to said eddy currents for indicating the presence of a segment; and
- magnetic flux shielding means between said coil and said segments, said shielding means defining a window through which flux from said coil extends to said segments.

2. The system of claim 1 wherein said plurality of segments are metallic foil, and said insulating means is a backing to which said segments are secured.

3. The system of claim 2 wherein said insulating means and metalic foil are secured between opaque electrical insulation laminae for visibly obscuring said segments.

4. The system of claim 1 wherein said magnetic flux shielding means is nonmagnetic electrically conducting foil.

5. In a system for reading an encoded record, comprising:
- a plurality of nonmagnetic electrically conductive segments for conducting eddy currents, each of said segments being electrically separate, said segments being positioned in a coded arrangement;
- electrical insulating means for holding said segments in said coded arrangement;
- means for detecting the coded arrangement of said segments, said detecting means including means for inducing eddy currents in said segments, said inducing means for being responsive to said eddy currents for indicating the presence of a segment, said inducing means including an oscillator circuit having a coil for inducing eddy currents in said segments, said oscillator circuit being responsive to said eddy currents for reducing the oscillating power in said oscillator circuit; and
- magnetic flux shielding means between said coil and said segments, said shielding means defining a window through which flux from said coil extends to said segments.

6. The system of claim 5 wherein said magnetic flux shielding means is nonmagnetic electrically conducting foil.

7. In a system for reading an encoded record, comprising:
- a plurality of nonmagnetic electrically conductive segments for conducting eddy currents, each of said segments being electrically separate, said segments being positioned in a coded arrangement;
- electrical insulating means for holding said segments in said coded arrangement; and
- means for detecting the coded arrangement of said segments, said detecting means including means for inducing eddy currents in said segments, said eddy-current-inducing means including an oscillator circuit having a first coil for successively inducing eddy currents in successive ones of said segments, said oscillator being operable for normally producing oscillations of a constant amplitude;
- said detecting means being responsive to said eddy currents for generating a first of pulses corresponding to the coding of said segments, each of said pulses originating in said first coil.

8. The system of claim 7, wherein said detecting means further includes a rectifier connected to said oscillator for producing a first voltage level responsive to normal oscillations in said oscillator and for producing a second voltage level responsive to oscillations of reduced power when one of said segments is adjacent to said coil.

9. The system of claim 8, wherein said detecting means further includes means for transmitting said first and second voltage levels of said rectifier over a single line to a means for comparing said voltage levels with stored information and transmitting an output signal responsive to the comparison of said voltage levels and said stored information, and means actuated by said output signal.

10 The system of claim 7 wherein said segments are arranged in a column, said coil is aligned with said segments, said detecting means being responsive to movement of each segment past said coil for generating a corresponding output pulse, a series of asynchronous pulses being generated upon movement of all said segments part said coil, said coil being driven by said oscillator at a frequency that provides a plurality of periods of oscillation during movement of each segment past said coil.

11. The system of claim 10 wherein the frequency of said oscillations are in the range of 2 MHz.

12. The system of claim 7 further including a second plurality of electrically conductive segments, said detecting means including a second coil for successively inducing eddy currents in successive ones of said second plurality of segments, said detecting means being responsive to eddy currents in said second plurality of segments for generating a second series of pulses corresponding to the coding of said second plurality of segments, each pulse of said second series originating in said second coil.

13. The system of claim 2 wherein said detecting means includes means for applying said first and second series of pulses to a single line for transmission to a utilization device.